(12) United States Patent
Berry, III et al.

(10) Patent No.: US 7,347,933 B2
(45) Date of Patent: Mar. 25, 2008

(54) SELF-CLEANING INTAKE SCREEN

(75) Inventors: Russell M. Berry, III, Elk Grove, CA (US); Russell M. Berry, IV, Sacramento, CA (US)

(73) Assignee: Intake Screens, Inc., Sacramento, CA (US)

( * ) Notice: Subject to any disclaimer, the term of this patent is extended or adjusted under 35 U.S.C. 154(b) by 0 days.

(21) Appl. No.: 10/989,871

(22) Filed: Nov. 15, 2004

(65) Prior Publication Data

US 2005/0126967 A1 Jun. 16, 2005

Related U.S. Application Data

(60) Provisional application No. 60/520,913, filed on Nov. 17, 2003.

(51) Int. Cl.
*B01D 33/44* (2006.01)
*B01D 33/46* (2006.01)

(52) U.S. Cl. .............. 210/158; 210/161; 210/396; 210/402; 210/407; 210/408; 210/107; 210/791

(58) Field of Classification Search ............... 210/391, 210/396, 402, 403, 407, 408, 791
See application file for complete search history.

(56) References Cited

U.S. PATENT DOCUMENTS

| | | | |
|---|---|---|---|
| 578,179 A | | 3/1897 | Wolford |
| 628,517 A | | 7/1899 | Bliss et al. |
| 658,196 A | * | 9/1900 | Whitney ............ 210/158 |
| 793,720 A | * | 7/1905 | Godbe ............ 210/396 |
| 810,020 A | * | 1/1906 | Applegate ............ 210/396 |
| 915,436 A | * | 3/1909 | Henoke ............ 210/391 |
| 969,364 A | | 9/1910 | Grootenhuis |
| 1,051,757 A | | 1/1913 | Powers |
| 1,123,888 A | | 1/1915 | Kempf |
| 1,210,759 A | | 1/1917 | Breddin |
| 1,348,945 A | | 8/1920 | Hirshstein |
| 2,013,971 A | | 9/1935 | Raisch |
| 2,022,336 A | | 11/1935 | Bower |
| 2,136,853 A | | 11/1938 | Knecht |
| 2,530,916 A | | 11/1950 | Stratton |
| 3,347,379 A | * | 10/1967 | Miller ............ 210/127 |
| 3,741,388 A | * | 6/1973 | Takahashi ............ 210/770 |
| 3,850,802 A | * | 11/1974 | Berger ............ 210/106 |

(Continued)

FOREIGN PATENT DOCUMENTS

EP 531747 A1 * 3/1993

OTHER PUBLICATIONS

Definitions of "manifold" dowloaded from www.Dictionary.com on Aug. 20, 2007; one page.*

(Continued)

*Primary Examiner*—Robert James Popovics
(74) *Attorney, Agent, or Firm*—DLA Piper US LLP

(57) ABSTRACT

A self-cleaning screen that automatically cleans both the inside and outside surfaces of the cylindrical screen using only the rotation of the cylindrical screen itself. This self-cleaning ability is accomplished by using a fixed brush on the exterior surface of the screen, and a freely rotating brush on the interior surface of the screen, where the freely rotating brush is driven by the movement of the screen itself.

15 Claims, 7 Drawing Sheets

U.S. PATENT DOCUMENTS

| | | | |
|---|---|---|---|
| 3,872,006 A * | 3/1975 | Abel | 210/158 |
| 4,017,394 A | 4/1977 | Hensley | |
| 4,217,220 A * | 8/1980 | Egli et al. | 210/791 |
| 4,220,540 A * | 9/1980 | Hagihara | 210/415 |
| 4,224,166 A * | 9/1980 | Wyman | 210/396 |
| 4,233,159 A * | 11/1980 | Senda et al. | 210/413 |
| 4,266,601 A * | 5/1981 | Jenkins | 165/94 |
| 4,469,230 A * | 9/1984 | Gorlitz et al. | 209/683 |
| 4,521,305 A * | 6/1985 | Deal | 210/158 |
| 4,658,708 A * | 4/1987 | Rastoin | 99/323.9 |
| 4,812,231 A * | 3/1989 | Wiesemann | 210/158 |
| 4,818,402 A * | 4/1989 | Steiner et al. | 210/411 |
| 4,836,919 A * | 6/1989 | Huber | 210/158 |
| 4,874,017 A | 10/1989 | Hendrickson | |
| 4,913,811 A * | 4/1990 | Huang et al. | 210/167.27 |
| 4,923,600 A * | 5/1990 | Krofta | 210/107 |
| 4,983,290 A * | 1/1991 | Schumann | 210/413 |
| 5,024,763 A * | 6/1991 | Schlaginhaufen | 210/333.01 |
| 5,032,264 A | 7/1991 | Geiger | |
| 5,055,205 A * | 10/1991 | White | 210/784 |
| 5,094,604 A * | 3/1992 | Chavez et al. | 425/222 |
| 5,102,537 A | 4/1992 | Jones | |
| D327,693 S * | 7/1992 | Berry | D15/141 |
| 5,183,568 A * | 2/1993 | Lescovich | 210/360.1 |
| 5,192,429 A * | 3/1993 | Bader | 210/170.09 |
| 5,271,751 A * | 12/1993 | Lagler | 55/295 |
| 5,322,792 A * | 6/1994 | Peguy | 435/290.3 |
| 5,370,791 A * | 12/1994 | Lescovich et al. | 210/107 |
| 5,401,396 A * | 3/1995 | Lescovich et al. | 210/108 |
| 5,426,864 A * | 6/1995 | Svehaug et al. | 34/70 |
| 5,480,465 A * | 1/1996 | Cox | 55/472 |
| 5,514,265 A * | 5/1996 | Nowak et al. | 210/136 |
| 5,558,042 A * | 9/1996 | Bradley et al. | 119/226 |
| 5,676,829 A * | 10/1997 | Cotterill | 210/158 |
| 5,851,087 A * | 12/1998 | Berry, III | 405/127 |
| 6,089,790 A | 7/2000 | Berry, III et al. | |
| 6,123,841 A * | 9/2000 | Gotoh | 210/167.22 |
| 6,177,022 B1 * | 1/2001 | Benenson et al. | 210/791 |
| 6,248,145 B1 * | 6/2001 | Radke | 55/295 |
| 6,258,594 B1 * | 7/2001 | Nakaya | 435/290.1 |
| 6,270,669 B1 * | 8/2001 | Bauer | 210/237 |
| 6,500,344 B1 * | 12/2002 | Lee et al. | 210/744 |
| 6,572,763 B2 * | 6/2003 | Gorshing | 210/159 |
| 6,616,840 B1 * | 9/2003 | Boele | 210/297 |
| 6,640,530 B1 * | 11/2003 | Arbuckle | 56/130 |
| 6,666,976 B2 * | 12/2003 | Benenson et al. | 210/784 |
| 6,808,076 B2 * | 10/2004 | Villares Lenz Cesar | 210/391 |
| 7,083,735 B2 * | 8/2006 | Laing | 210/791 |
| 2001/0054591 A1 * | 12/2001 | Gorshing | 210/769 |
| 2003/0098273 A1 * | 5/2003 | Benenson et al. | 210/393 |
| 2004/0112825 A1 * | 6/2004 | Villares Lenz Cesar | 210/391 |
| 2005/0126967 A1 * | 6/2005 | Berry et al. | 210/158 |

OTHER PUBLICATIONS

Custom Technology Co., Inc., specification sheet for Self Cleaning Suction Screen, 2 pages, date unknown.
Claude Laval Corp., product description brochure for Self Cleaning Pump Intake Screens, 4 pages, revised Apr. 1991.
Declaration of Russell M. Berry, dated Jun. 24, 1998 with figure.

* cited by examiner

SELF-CLEANING INTAKE SCREEN

This application claims the benefit of U.S. Provisional Patent Application No. 60/520,913, which was filed on Nov. 17, 2003.

FIELD OF THE INVENTION

This invention relates to intake screens to exclude material from entering a water inlet, and is particularly directed to a self-cleaning intake screen.

BACKGROUND OF THE INVENTION

Self-cleaning intake screens are well known in the art. The earliest of such devices simply employed some mechanism to cause the screen, generally cylindrical in shape, to rotate within the stream or waterway. A water vacuum is generated inside the cylindrical screen, drawing water through the screen for filtration. As the screen rotates, any debris trapped on its upstream side would be washed away as it turns downstream. More sophisticated devices employ some sort of backwash system which, either continually or at periodic intervals, spray a high pressure jet of water or air against the screen in an attempt to blow debris off of and away from the outside of the screen. However, most self-cleaning intake screen designs are complicated and/or do not effectively keep the screen free from debris.

More recently, brushes and scrapers have been added to the outside of cylindrical screens, to scrape off debris and silt from the outer surface of the screen as the screen rotates, so that water flow through the screen to the interior of the screen is not unnecessarily impeded. However, for many applications, the interior of the screen still experiences an intolerable build up of debris and silt. For example, one application involves a screen made of wedge wires, which are thick wire strands that extend circumferentially around a support structure. The support structure includes longitudinally extending support members that are attached to the inside surface of the wedge wire screen, and are spaced one or several inches apart. It has been found that an external brush sweeping across the outer surface of the wedge wire screen fails to adequately clean the inside surface of the wedge wire and the support members, as well as possibly the laterally facing surfaces of the wedge wires. Spacing the support members further apart can reduce silt buildup, but then the screen no longer has the desired structural integrity, and the cylinder can lose its roundness as the wedge wire tends to lie flat between the support members.

It is also known to place a spirally oriented, motorized cleaning brush on the inside surface of a rotating cylindrically shaped screen, where the brush rotates in the opposite direction as the moving direction of the screen. However, such motorized cleaning brushes will not work with wedge wire type screens such as the one described above, because the brush will continually encounter the support members, which are not flush with the inside surface of the wedge wire screen. Thus, any brushes designed to clear the support members will not adequately clean the interior and lateral surfaces of the wedge wire. Moreover, it is expensive and difficult to include a separate motor, inside the cylindrical screen, to operate the rotating brush.

There is a need for an intake screen that reliably and effectively cleans itself, even its interior surfaces, without adding the complexity of additional motors.

SUMMARY OF THE INVENTION

The present invention solves the aforementioned problems by providing a self-cleaning screen that automatically cleans both the inside and outside surfaces of the cylindrical screen using only the rotation of the cylindrical screen itself. This is accomplished by using a fixed brush on the exterior surface of the screen, and a freely rotating brush on the interior surface of the screen, where the freely rotating brush is driven by the movement of the screen itself.

The invention can be implemented in numerous ways, including as a method, system, and device. Various embodiments of the invention are discussed below.

In one embodiment of the invention, a self-cleaning intake screen comprises a rotatable intake screen configured to filter material from a flow of water, the intake screen having openings for passing the flow of water. Also included is a first cleaning element operatively coupled to the intake screen so as to remove the material from the openings during rotation of the intake screen.

In another aspect of the present invention, a self-cleaning intake screen includes a manifold, a cylindrically shaped screen defining a plurality of openings and rotatably mounted to the manifold, and a first cleaning element rotatably mounted to the manifold and engaged with the screen such that rotation of the screen causes rotation of the cleaning element.

In yet one more aspect of the present invention, a self-cleaning intake screen includes a cylindrically shaped manifold, a cylindrically shaped screen disposed around the manifold in a rotatable manner relative to the manifold, the screen defining a plurality of openings, a motor for rotating the screen around the manifold, and a first cleaning element rotatably mounted to the manifold and disposed between the manifold and the screen, the cleaning element engaged with an interior surface of the screen such that rotation of the screen causes rotation of the cleaning element.

Other aspects and advantages of the invention will become apparent from the following detailed description taken in conjunction with the accompanying drawings which illustrate, by way of example, the principles of the invention.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION OF THE PREFERRED EMBODIMENTS

Figure 1:
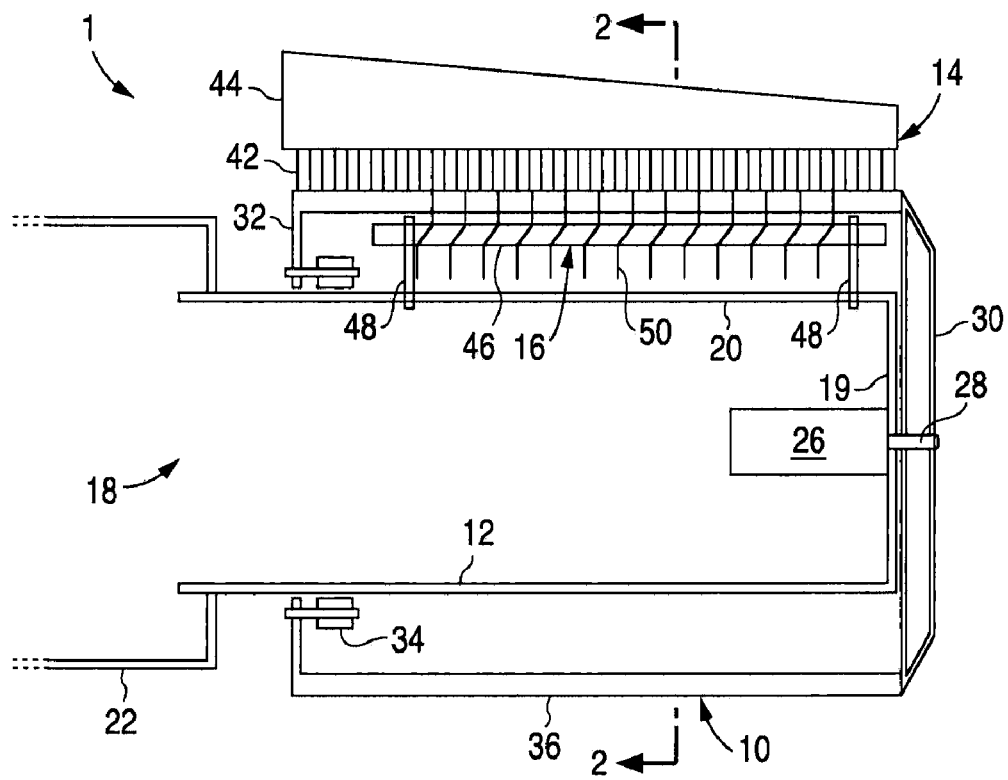
FIG. 1 is a cross-sectional side view of the self-cleaning intake screen of the present invention.
Figure 2:
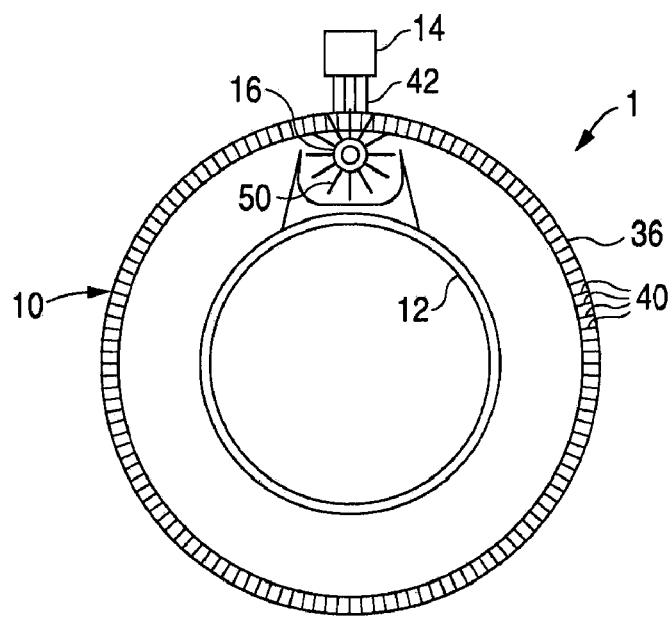
FIG. 2 is a cross-sectional end view of the self-cleaning intake screen of the present invention.

The present invention is self-cleaning intake screen assembly 1, as shown in FIGS. 1 and 2. The assembly 1 includes a cylindrical shaped screen 10 rotatably mounted to a suction manifold 12, an external fixed brush 14, and an internal rotating brush 16. The entire assembly is designed to be submerged under water, where suction applied inside the suction manifold 12 draws water through the cylindrical screen 10 and the suction manifold 12, where the screen 10 filters out contaminants from the water.

Suction manifold 12 is cylindrically shaped, having an open end 18, a closed end 19, and a cylindrically shaped sidewall 20. A pump manifold 22 (attached to the intake side of a pump which is not shown) is connected to the suction manifold 12, for drawing water through the screen 10 and the suction manifold 12 and eventually to the pump (not shown). The suction manifold 12 includes a plurality of apertures 24 formed in its cylindrical sidewall 20 through which water will flow, as better shown in FIG. 3. The apertures 24 are evenly spaced to ensure a more even flow of water though various portions of screen 10. Motor 26 is mounted to the closed end 20 of suction manifold 12, and includes a rotating drive shaft 28 that extends through the suction manifold closed end 20.

Figure 9:
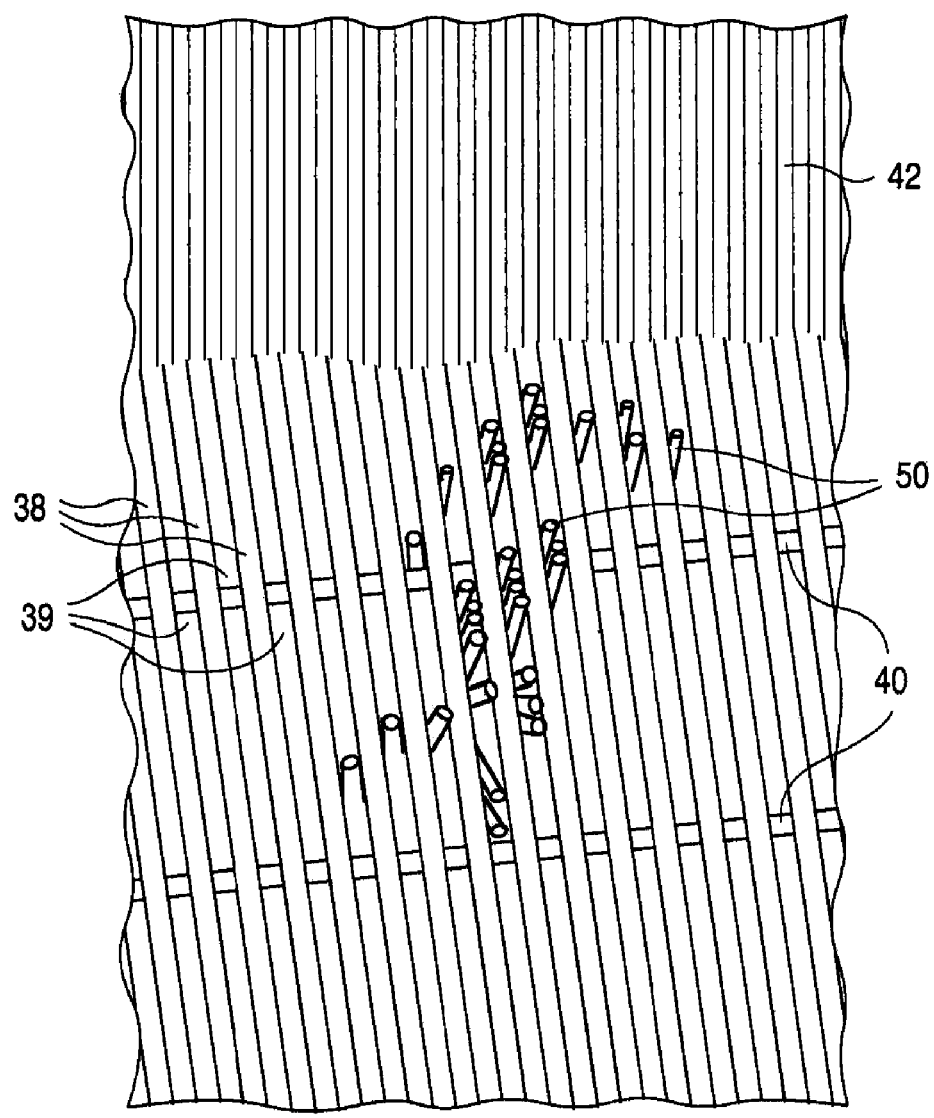
FIG. 9 is a perspective view of the wedge wire surface, external brush, and protruding bristles of the interior brush, of the self-cleaning intake screen of the present invention.

Screen 10 includes a first end plate 30 connected to the motor drive shaft 28, a second end plate 32 with a plurality of rollers 34 attached thereto, and a sidewall 36 formed by wedge wire 38 extending circumferentially around a center of the screen 10 and supported by support members 40 that longitudinally extend between the first and second end plates 30/32, as best shown in FIGS. 1 and 4-6. Wires 38 are separated from each other to form small openings 39 therebetween through which the water flows (as best seen in FIG. 9). Screen 10 is disposed around suction manifold 12, and is rotatably supported at one end by the motor drive shaft 28 and the other end by the rollers 34 (which engage the suction manifold cylindrical sidewall 20).

The external brush 14 includes bristles 42 supported by a support bracket 44, as best illustrated in FIGS. 2-5. Bristles 42 sweep across the outer surface of the screen sidewall 36 (wedge wire 38) as the screen 10 rotates relative to the suction manifold 12.

Figure 3:
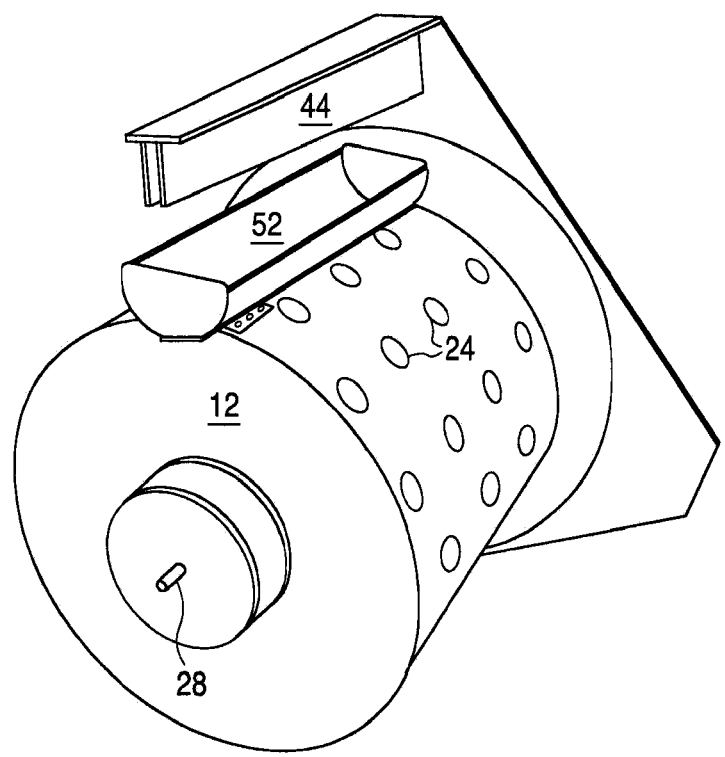
FIG. 3 is a perspective view of the suction manifold of the self-cleaning intake screen of the present invention.
Figure 4:
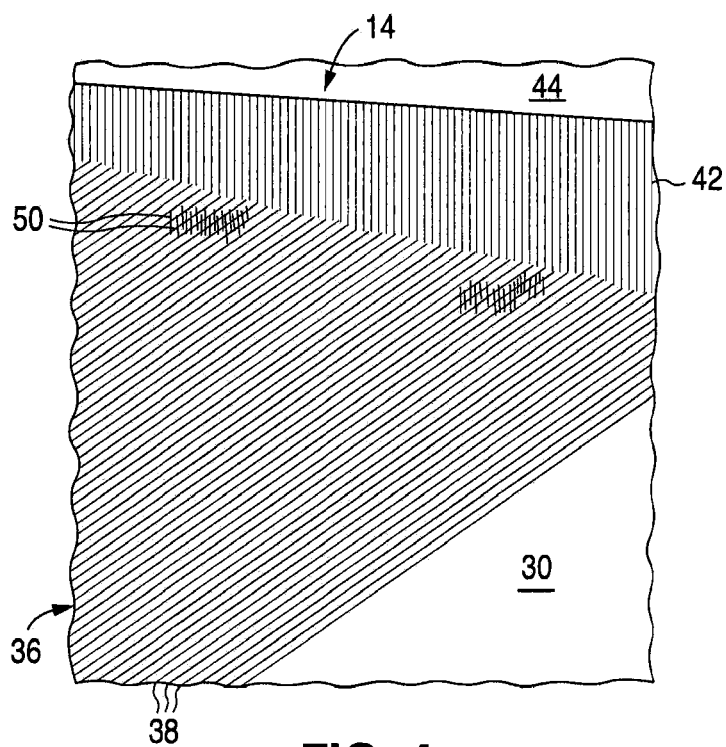
FIGS. 4 and 5 are perspective views of the wedge wire surface and external brush of the self-cleaning intake screen of the present invention.
Figure 5:
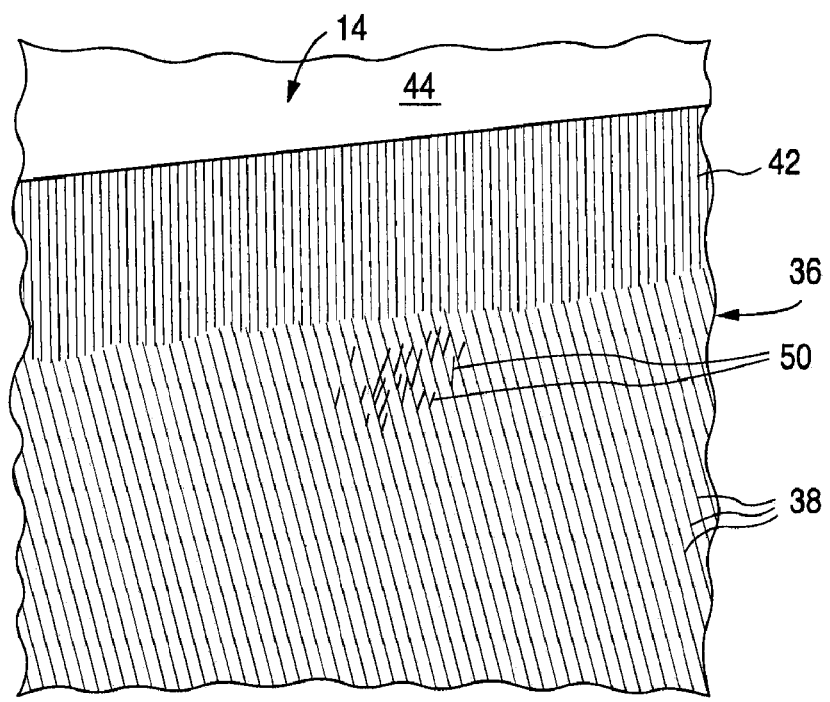
Figure 7:
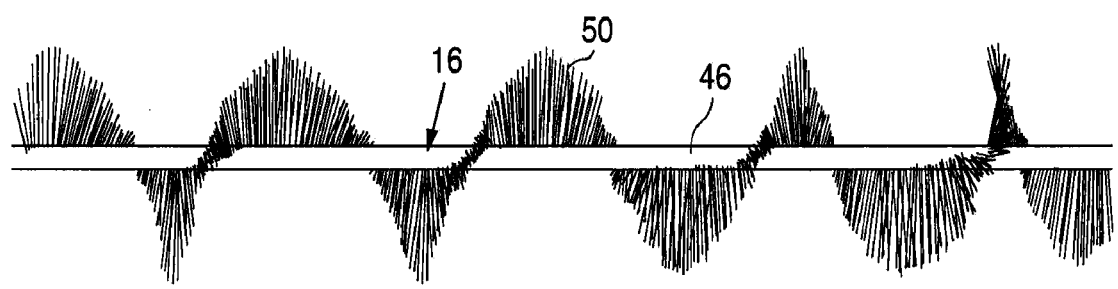
FIG. 7 is a top view of the internal brush of the self-cleaning intake screen of the present invention.
Figure 6:
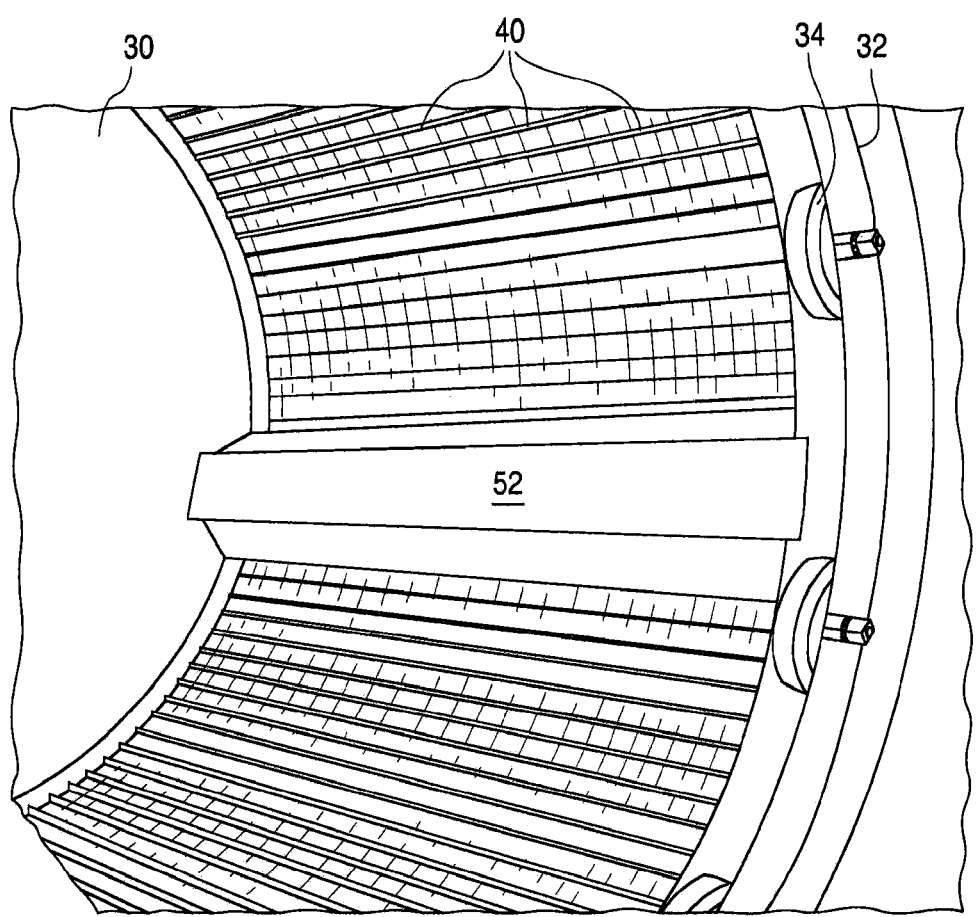
FIG. 6 is a perspective view of the interior of the self-cleaning intake screen of the present invention.
Figure 8:
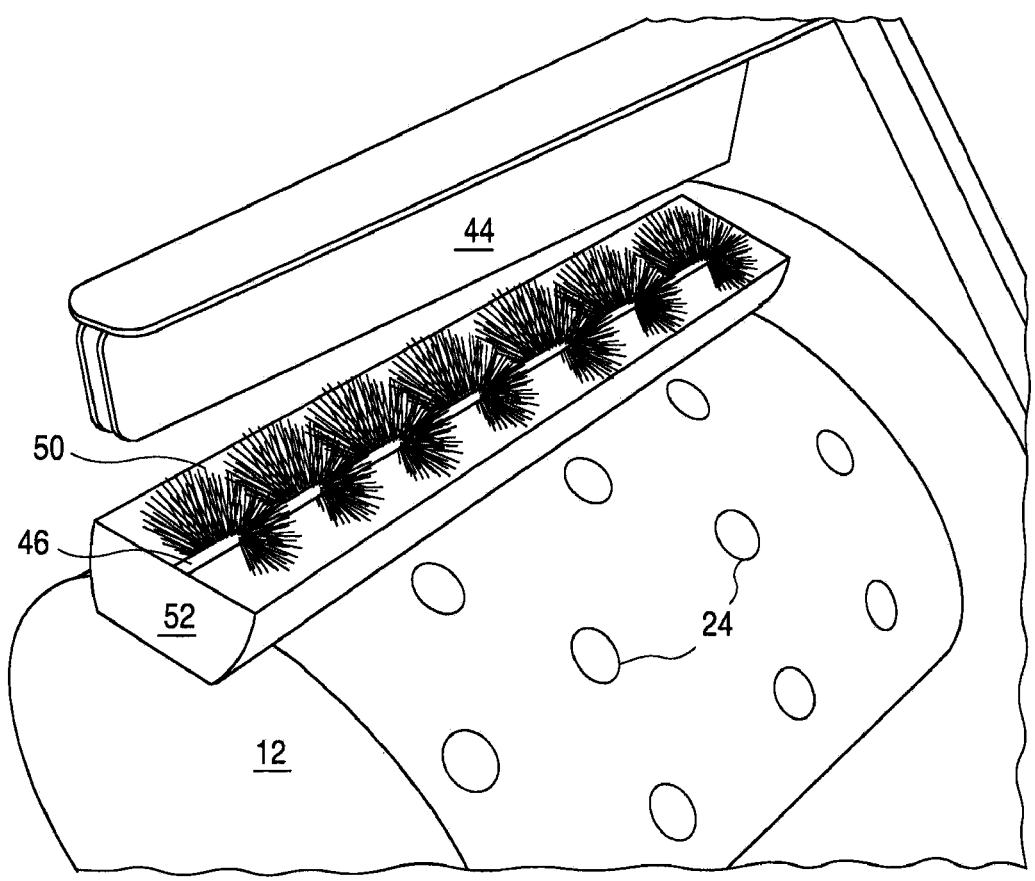
FIG. 8 is a perspective view of the suction manifold and internal brush of the self-cleaning intake screen of the present invention.

The internal brush 16 includes a shaft 46 rotatably mounted to the suction manifold 12 via brackets 48, and bristles 50 extending from the shaft 46 preferably, but not necessarily, in a spiral fashion, as best illustrated in FIGS. 2 and 7. Brackets 48 can be incorporated as end plates of a unitary trough or tray 52 for integrity, as best shown in FIGS. 3 and 8. The brush 16 is positioned to engage with the interior surface of screen sidewall 36 (wedge wire 38 and support members 40).

In operation, motor 26 rotates screen 10 relative to suction manifold 12. As screen 10 rotates, bristles 42 of fixed external brush 14 slide across the outer surface of sidewall 20 (i.e. outer surface of wedge wire 38) dislodging material such as debris and silt therefrom. Also, as screen 10 rotates, the support members 40 act as gear teeth by engaging with and rotating internal brush 16. As internal brush 16 rotates, its bristles 50 engage with support members 40 and inner and side surfaces of wedge wire 38, even poking through the wedge wire 38 as illustrated in FIG. 9. This engagement wipes and dislodges debris and silt from the support members 40 and the inner/side surfaces of wedge wire 38. By rotating with the passing support members 40 (in a passive manner), the internal brush 16 effectively cleans the interior of the screen 10 in a manner that the external fixed brush 14 can not. Also, by passively rotating internal brush 16 using the rotation of screen sidewall 36, a second motor and/or complicated gearing is avoided. Thus, the rotation of screen 10 operates both brushes (one fixed and one rotating) without the need for any additional motors or moving parts.

The preferred embodiment includes a pair of screen assemblies 1 mounted to a single pump manifold. Hoist mechanisms can be used to lower and raise the intake screen assembly into a waterway for use. Components with dissimilar metals are electrically isolated to prevent electrolysis.

Figure 10:
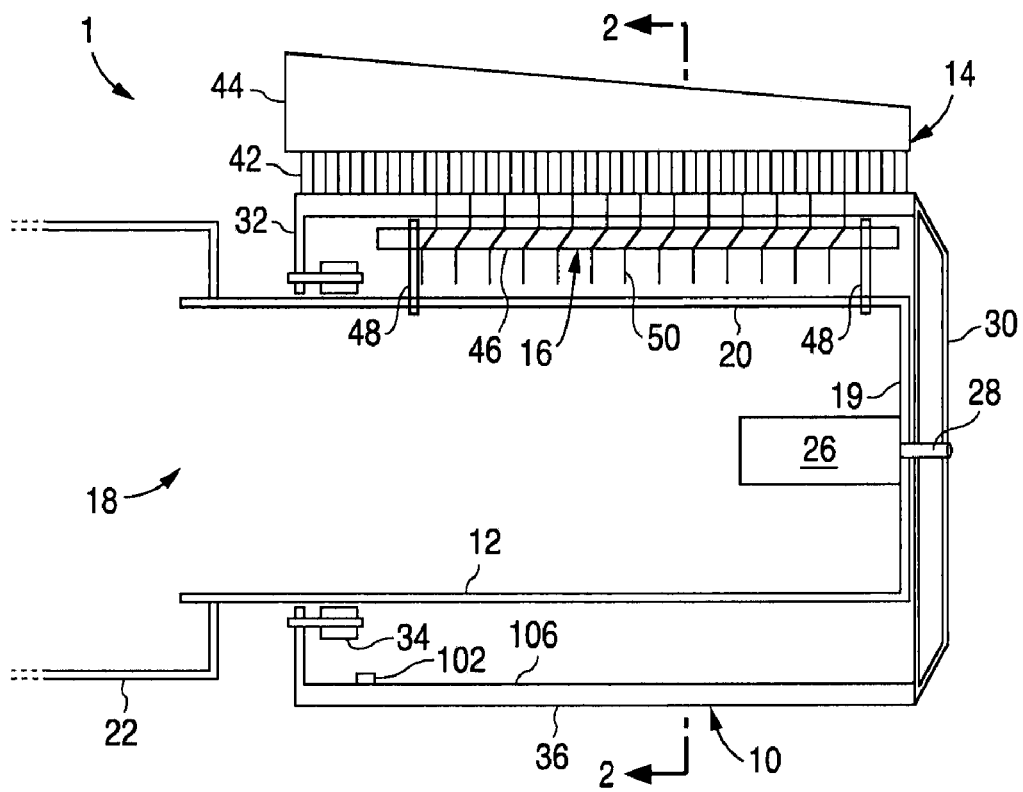
FIG. 10 is a cross-sectional side view of an alternate embodiment of the present invention.
Figure 11:
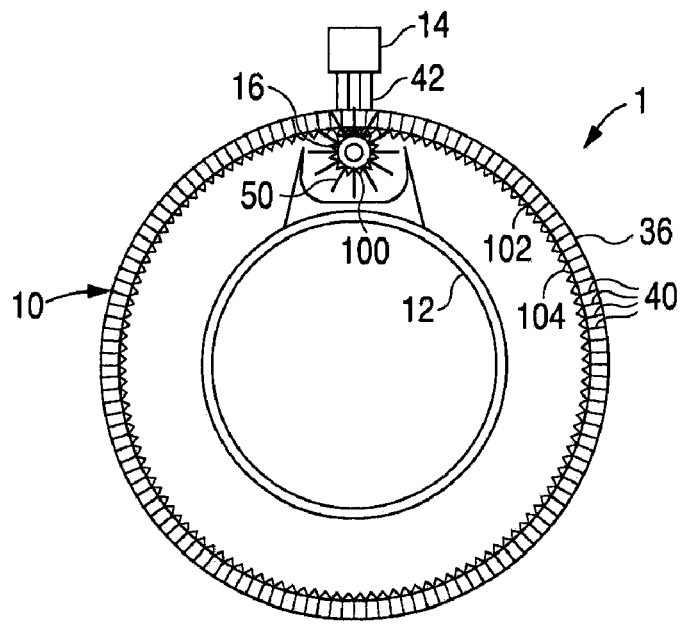
FIG. 11 is an end view of the alternate embodiment of the present invention.

One of skill will realize that the invention is not limited to the embodiment described above. Rather, alternate embodiments exist. FIGS. 10-11 illustrate one such alternate embodiment. The embodiment of FIGS. 10-11 highlights the fact that the invention is not limited to configurations in which the brush 16 is rotated only by its bristles 50. Rather, here, the brush 16 has a gear 100 that is aligned with a complementary rack 102 that is positioned along the inner surface 104 of the screen 10, and whose teeth 104 are configured to interlock with the teeth of the gear 100 in a rack-and-pinion type arrangement. Accordingly, rotation of the screen 10 and rack 102 also induces rotation of the gear 100 and thus the brush 16. In this embodiment, the bristles 50 need not frictionally engage against the screen 10, as the brush 16 is turned by the rack 102 and gear 100. This reduces wear on the bristles 50 and extends the useful life of the brush 16.

It is to be understood that the present invention is not limited to the above embodiments, but includes others besides those already disclosed above. For example, the internal brush 16 is simply coupled to the screen 10 so that rotation of the screen 10 also moves the internal brush 16 against the screen 10. The brush 16 need not be moved specifically by its bristles 50, but instead can be moved by rotation of the screen 10 in any appropriate manner. The use of passively rotating internal brush 16 need not be used in conjunction with a suction manifold for applications where even water flow through the screen 10 is not needed. While internal and external brushes 14/16 are shown as mounted in an opposing fashion (on either side of the screen sidewall 36), such an opposing relationship is unnecessary. The screen sidewall 10 need not be formed of wedge wire 38 and support members 40, but can be formed of any mesh or other known screen materials (i.e. thin wires to thick wires that resemble rigid bars) that provide the desired filtration of water flowing therethrough and can engage and rotate the internal brush 16. The internal and external brushes 14/16 need not be brushes with protruding bristles 50/42, but can be any cleaning element capable of removing material from the intake screen 10, such as scrubbing pads or the like. In particular, the internal brush 16 can be a cleaning element having any configuration that allows it to engage against the intake screen 10 so as to induce rotation. The flow of water can be reversed from that shown, in which case the support members 40 are preferably on the outside of the screen as is the rotating brush 16, and the fixed brush 14 is mounted inside the screen. The spacing and sizes of holes 24 can be varied to create more even flow. And, brush 16 can be freely disposed in tray 52, without the ends thereof being rotatably attached to the tray ends.

Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A self-cleaning intake screen for filtering material from a flow of water, comprising:
    a rotatable intake screen comprising:
        a cylindrically shaped sidewall formed of spaced apart wires extending circumferentially around a center of the intake screen and defining openings therebetween for passing a flow of water, and
        support members extending longitudinally across and supporting inner surfaces of the spaced apart wires;
    a manifold extending within the rotatable intake screen; and
    a first cleaning element operatively coupled to the intake screen so as to remove material from the intake screen during rotation of the intake screen, wherein the first cleaning element is a brush having bristles configured to engage with and remove material from the support members and the wire inner surfaces, and to protrude into and remove material from the openings, and wherein the first cleaning element is rotatably coupled to the intake screen so that rotation of the intake screen in a rotation direction induces rotation of the first cleaning element in the rotation direction.

2. The self-cleaning intake screen of claim 1, wherein rotation of the intake screen causes the intake screen to exert a rotational force on some of the bristles causing the first cleaning element to rotate so that others of the bristles engage the intake screen.

3. The self-cleaning intake screen of claim 1 further comprising a second cleaning element proximate to an outer surface of the cylindrical sidewall, the second cleaning element configured to further remove material from the openings and the outer surface when the intake screen is rotated.

4. The self-cleaning intake screen of claim 1 further comprising a gear coupled to the first cleaning element and a complementary rack coupled to the intake screen and the gear, wherein rotation of the intake screen and the pinion rotates the gear so as to induce rotation of the first cleaning element.

5. A self-cleaning intake screen for filtering material from a water flow, comprising:
    a manifold;
    a cylindrically shaped screen rotatably mounted to the manifold, the screen comprising:
        a cylindrically shaped sidewall formed of spaced apart wires extending circumferentially around a center of the screen and defining openings therebetween, and
        support members extending longitudinally across and supporting inner surfaces of the spaced apart wires; and
    a first cleaning element rotatably mounted to the manifold and engaged with the screen such that rotation of the screen in a rotation direction causes rotation of the first cleaning element in the rotation direction, wherein the first cleaning element is a brush with bristles that are configured to engage with and remove material from the support members and the wire inner surfaces, and to protrude into and remove material from the openings.

6. The self-cleaning intake screen of claim 5, further comprising:
    a second cleaning element mounted to the manifold and adjacent an exterior surface of the screen, wherein the second cleaning element slides along the exterior surface as the screen rotates.

7. The self-cleaning intake screen of claim 5, further comprising:
    a motor for rotating the screen relative to the manifold.

8. The self-cleaning intake screen of claim 5, wherein the pipe includes a cylindrically shaped member about which the screen rotates, and wherein the first cleaning element is mounted between the cylindrically shaped member and the screen.

9. The self-cleaning intake screen of claim 5, wherein the first cleaning element includes a shaft.

10. The self-cleaning intake screen of claim 9, wherein the bristles extend from the shaft in a spiral manner.

11. The self-cleaning intake screen of claim 9, further comprising:
    a tray mounted to the pipe, wherein the first cleaning element is rotatably disposed in the tray.

12. A self-cleaning intake screen for filtering material from a flow of water, comprising:
    a cylindrically shaped manifold;
    a cylindrically shaped screen disposed around the manifold in a rotatable manner relative to the pipe, the screen comprising:
        a cylindrically shaped sidewall formed of spaced apart wires extending circumferentially around a center of the screen and defining openings therebetween, and
        support members extending longitudinally across and supporting inner surfaces of the spaced apart wires;
    a motor for rotating the screen around the manifold;
    a first cleaning element rotatably mounted to the manifold and disposed between the pipe and the screen, the first cleaning element engaged with an interior surface of the screen such that rotation of the screen in a rotation direction causes rotation of the cleaning element in the rotation direction, wherein the first cleaning element is a brush with bristles that are configured to engage with and remove material from the support members and the wire inner surfaces, and to protrude into and remove material from the openings.

13. The self-cleaning intake screen of claim 12, wherein the cleaning element includes a shaft, and wherein the bristles extend from the shaft in a spiral manner.

14. The self-cleaning intake screen of claim 13, further comprising:
    a second cleaning element mounted to the manifold and adjacent an exterior surface of the screen, wherein the second cleaning element slides along an exterior surface of the screen as the screen rotates.

15. The self-cleaning intake screen of claim 13, further comprising:
    a tray mounted to the manifold, wherein the cleaning element is rotatably disposed in the tray.

* * * * *